United States Patent [19]
Haraguchi et al.

[11] Patent Number: 5,669,670
[45] Date of Patent: Sep. 23, 1997

[54] LEATHER TRIM COVER ASSEMBLY FOR VEHICLE SEAT AND METHOD FOR FORMING THE SAME

[75] Inventors: Youichiro Haraguchi, Akishima; Kenichi Kumazawa, Akita-ken, both of Japan

[73] Assignee: Tachi-S Co., Ltd., Tokyo, Japan

[21] Appl. No.: 619,081

[22] Filed: Mar. 21, 1996

[51] Int. Cl.⁶ .................................................. A47C 7/24
[52] U.S. Cl. .................. 297/452.61; 297/219.1; 297/452.62; 297/452.58
[58] Field of Search ............... 297/452.61, 452.6, 297/452.62, 452.58, 219.1

[56] References Cited

U.S. PATENT DOCUMENTS

| | | | |
|---|---|---|---|
| 4,627,664 | 12/1986 | Okazaki et al. | 297/452.61 |
| 4,849,046 | 7/1989 | Kanazawa et al. | 297/452.61 X |
| 4,867,508 | 9/1989 | Urai | 297/452.61 X |
| 5,016,941 | 5/1991 | Yokota | 297/452.61 |
| 5,058,955 | 10/1991 | Sugiura et al. | 297/452.61 |
| 5,236,243 | 8/1993 | Reyes | 297/219.1 |

FOREIGN PATENT DOCUMENTS

| | | |
|---|---|---|
| 3-31399 | 3/1991 | Japan. |
| 6-114944 | 4/1994 | Japan. |
| 8-66571 | 3/1996 | Japan. |

*Primary Examiner*—Peter M. Cuomo
*Assistant Examiner*—Rodney B. White
*Attorney, Agent, or Firm*—Browdy and Neimark

[57] ABSTRACT

A leather trim cover assembly comprising a leather top cover layer and a foam wadding layer. Those two layers are cut in a predetermined shape, as by stamping, and then bonded together along their peripheral end portions to define a bonded area therein. Sewing is effected along such bonded area to connect together the two layers to form a trim cover assembly section, or a plurality of the thus-bonded trim cover assembly sections are sewn together at their respective bonded areas to form a trim cover assembly that can be bodily used on a vehicle seat.

18 Claims, 3 Drawing Sheets

LEATHER TRIM COVER ASSEMBLY FOR VEHICLE SEAT AND METHOD FOR FORMING THE SAME

BACKGROUND OF INVENTION

1. Field of the Invention

The present invention relates to a leather trim cover assembly for use with a vehicle seat and a method for forming the same. In particular, the invention is directed to a natural leather trim cover assembly for vehicle seat and a method for sewing a natural leather material with a foam wadding material to form the natural leather trim cover assembly.

2. Description of Prior Art

A vehicle or automotive seat is normally formed from a cushion member and a trim cover assembly covering the cushion member. FIG. 1 shows a seat cushion (SC) of the seat, by way of example, on which three typical seat sections (A, B, C) of trim cover assembly are sewn together to cover the corresponding portions of a cushion member (FC). Namely, the designations (A)(A), (B) and (C) represent a pair of lateral bolster sections, a central seating section, and a peripheral skirt section, which all form a trim cover assembly covering the corresponding outer surface areas of the cushion member (FC).

The trim cover assembly per se comprises a top cover layer and a slab foam wadding layer (urethane foam) to enhance a soft touch thereof. In particular, a natural leather (formed from a cowhide, horse hide or other animal hides) is used for the top cover layer to give an improved touch and texture in the trim cover assembly.

As shown in FIGS. 2 and 3, forming such natural leather trim cover assembly has been effected, in the past, through the steps of: preforming a certain shape of natural leather top cover layer material (10 or 10'); placing it on a large sheet of a foam wadding layer base material (i.e. 20 or 20'); and using a sewing machine with a cutter to sew together the juxtaposed layers of those two materials (10 or 10')(20 or 20') while simultaneously cutting the wadding layer base material along the peripheral terminal ends of top cover layer material (10 or 10'), so as to produce a two-layer lamination of trim cover assembly section. FIG. 2 shows the central seating section (B) of trim cover assembly of this kind formed by such conventional sewing method. In FIG. 3, one terminal end of such resulting central seating section (B) is depicted to be sewn integrally with that of one resulting lateral bolster section (A) which has been also formed by the same conventional sewing method. In this respect, the sewn unit of those two sections (A)(B) is affixed over the corresponding central and lateral bolster areas of cushion member (FC), with the downwardly projected part (P) created therebetween being fit in a groove (FC1), as can be seen from FIGS. 1 and 3. Designation (G) denotes a boundary groove which is naturally shown up along the seam between those two mutually sewn sections (A)(B).

However, it has been found that the resultant trim cover assembly (A or. B) formed simply by the conventional sewing method encounters an undesired objectionable floating or wavy wrinkles of the leather top cover layer (10 or 10') from the upper surface of wadding layer (20 or 20'), and the warping of the wadding layer (20 or 20') from the top cover layer (10 or 10'), during sewing operation, as indicated by the two-dot chain lines in FIGS., 2 and 3. This is attributed partly to the different elastic nature of each local part of natural leather which is taken out from different skin sections of animal body, such as its abdominal skin region or back skin region, and also partly to requiring a high expertise and long experiences on the worker's part to neatly sew together both two layers (10 or 10')(20 or 20') in a uniform state. Further, it has been difficult to position the top cover layer (10 or 10') precisely at a given point upon the wadding layer (20 or 20') because of no position determining means, such as some notches, being provided on the latter layer (20 or 20').

Apart from the natural leather material, a uniform lamination of unnatural leather top cover layer on a foam wadding layer has been suggested from the Japanese Laid-Open U.M. Pub. No. 3-31399, according to which, a plastic film is used, which is small relative to both top cover and wadding layers, and sandwiched therebetween, such that adhering margins are defined along the respective peripheral end portions of both top cover and wadding layers. In this prior art, after applying an adhesive to the adhering margin, the top cover and wadding layers are bonded together at all four sides thereof, with the plastic film serving to avoid a hollow creation between the two layers, in an attempt to make uniform a whole outer surface of resulting trim cover assembly. But, it is impossible to directly use a natural leather material having different elastic nature for that top cover layer in this prior art, because there is no technical consideration therein for that peculiar elasticity of natural leather material, with the result that the above-stated floating and wrinkle problems may easily occur, impairing an aesthetic appearance of the trim cover assembly. Moreover, the plastic film apparently reduces an original elastic effect of the wadding layer and degrades a whole soft cushioning touch of trim cover assembly.

SUMMARY OF THE INVENTION

In view of the above-stated drawbacks, it is a primary purpose of the present invention to provide a natural leather trim cover assembly for a vehicle seat, which is improved in its aesthetic appearance without the foregoing floating and wrinkle problems, and simplified in its formation.

In order to achieve such purpose, a leather trim cover assembly of the present invention basically comprises:
- a top cover layer made of a leather material, which is cut in a predetermined shape;
- a flat-plate-like elastic foam layer which is also cut in a predetermined shape;
- an adhesive applying area defined in one of a peripheral edge portion of the top cover layer and a peripheral edge portion of the flat-plate-like elastic foam layer;
- wherein the top cover layer is bonded on the elastic foam layer, by an adhesive agent, along the adhesive applying area, to define a bonded area therebetween, and is further sewn with the same foam layer at and along such bonded area.

Otherwise, in accordance with the invention, a plurality of trim cover assembly sections, each being of the above-described construction, excepting the sewing of the top cover layer with the elastic foam layer, may be sewn together at and along the bonded area so as to form a trim cover assembly that can be bodily used for a vehicle seat.

Preferably, the peripheral end portions respectively of those top cover layer and elastic foam layer may be provided with at least one position determining means for determining a relative position between the top cover layer and elastic foam layer as well as at least one sewing position determining means for determining a sewing position between one trim cover assembly section and another trim cover assembly section. Also, preferably, the top cover layer may be formed greater in size than the elastic foam layer such as to project the peripheral end portion thereof from the peripheral end portion of elastic foam layer.

It is a second purpose of the present invention to provide a method forming the foregoing trim cover assembly.

To this end, there is basically provided the steps of:

providing a top cover layer made of a leather material, which is cut in a predetermined shape;

providing a flat-plate-like elastic foam layer, which is cut in a predetermined shape;

applying an adhesive agent to one of a peripheral edge portion of the top cover layer and a peripheral end portion of the elastic foam layer, to define an adhesive applying area therein;

bonding the top cover layer to the elastic foam layer by means of an adhesive agent, so that those two layers are bonded together at the adhesive applying area to define a bonded area therebetween; and thereafter sewing the top cover layer with the elastic foam layer at and along the bonded area.

Otherwise, in accordance with the present invention, a plurality of trim cover assembly sections may each be formed in the above-described steps, excepting the step of sewing the top cover layer with the elastic foam layer, and then, all the thus-formed trim cover assembly sections be sewn together at and along the respective bonded areas thereof, so as to form a trim cover assembly that can be bodily used for vehicle seat.

All other features and advantages of the present invention will become apparent from reading of the descriptions hereinafter, with reference to the annexed drawings.

DETAILED DESCRIPTION OF PREFERRED EMBODIMENT OF THE INVENTION

Referring to FIGS. 4 through 9, there are shown one preferred mode of the present invention to bond a natural leather material to a foam wadding material for sewing them together to provide one trim cover assembly section or for sewing together several trim cover assembly sections to form a main natural leather trim cover assembly for vehicle seat.

Figure 1:
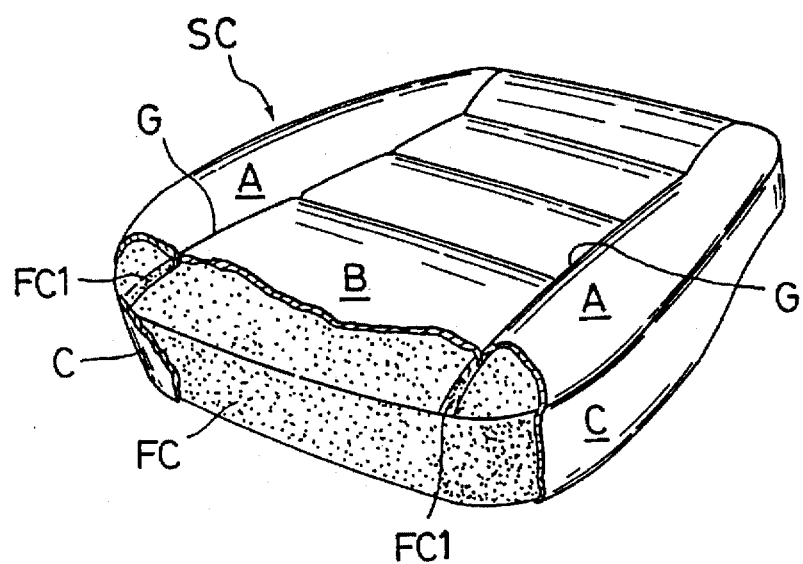
FIG. 1 is a partly broken perspective view of a seat cushion of a vehicle seat to which the present invention is applied.
Figure 2:
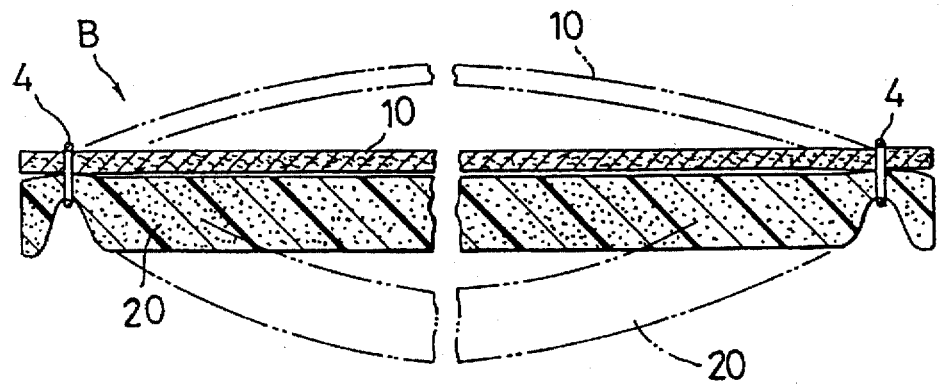
FIG. 2 a sectional view of a conventional trim cover assembly section.
Figure 3:
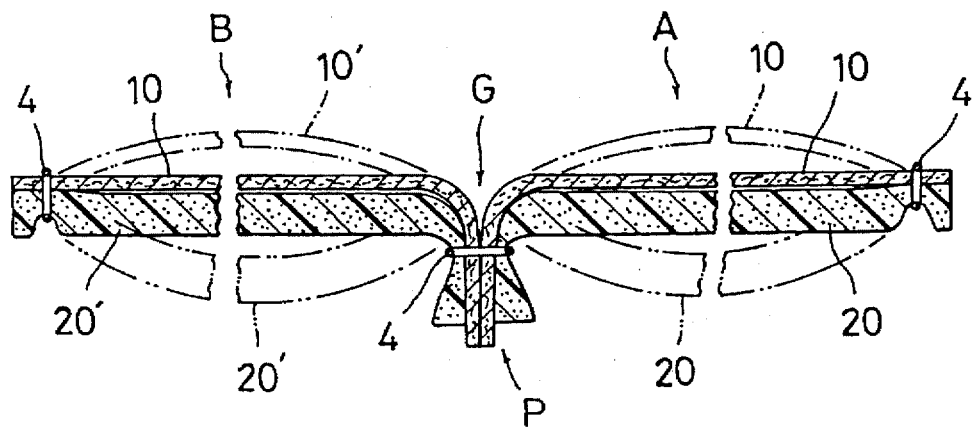
FIG. 3 is a sectional view showing a part of conventional trim cover assembly.
Figure 4:
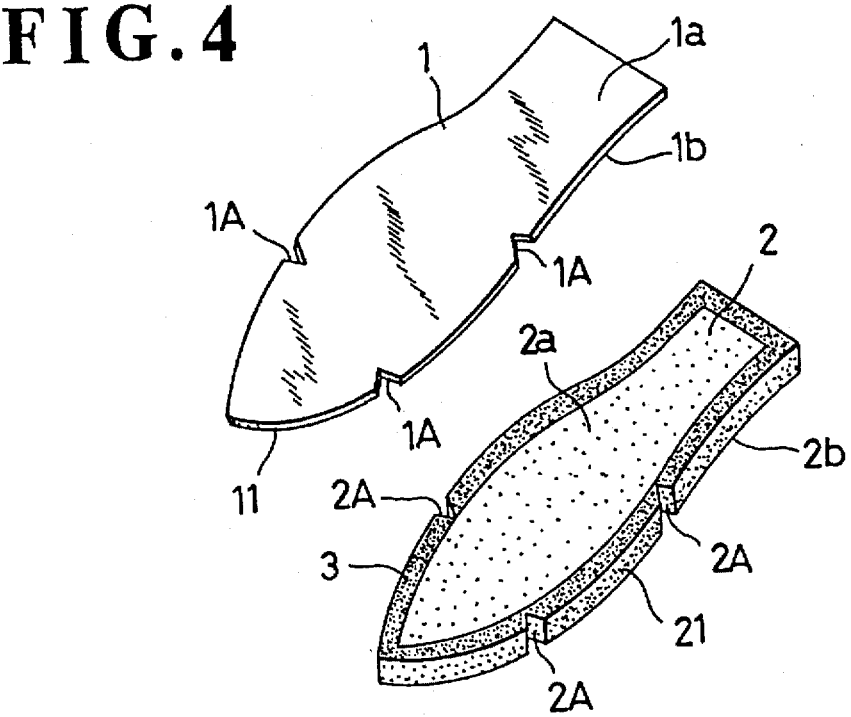
FIG. 4 is an exploded perspective view showing a principal part of trim cover assembly section in the present invention.

At first, FIG. 4 shows a strip of top cover layer material (1) and a strip of slab foam wadding layer material (2), which are each cut out from a sheet of corresponding base material, as by a press stamping, into the illustrated shape of trim cover assembly section (A) corresponding to one of the two lateral bolster sections of seat cushion (SC) shown in FIG. 1. It is noted that this is just one example, and of course, the same cutting method (as by a press stamping) should be effected to form other second trim cover assembly section (B) corresponding to the central seating section of seat cushion (SC) and third trim cover assembly section (C) corresponding to the lateral skirt section of seat cushion (SC). Now, turning back to FIG. 4, in accordance with the present invention, the top cover layer material (1) is made of a natural leather material, such as a cowhide or other animal hides, and thus, the natural leather top cover layer material (1) is firstly subjected to such press stamping process, using a proper known stamping machine (not shown), so that it is cut precisely in a predetermined shape conforming to one of the two lateral bolster sections (A)(A), without any creases and wrinkles therein, in contrast to the prior-art sewing method wherein a large wadding layer base material is cut along the peripheral end of top cover layer material, while sewing them together. The slab foam wadding layer material (2) is also firstly subjected to the same cutting as by press stamping. Hence, both top cover layer material (1) and wadding layer material (2) are provided in the form of a flat plate. It is appreciated that this preliminary stamping process is indeed effective not merely in retaining a predetermined shape of the wadding layer material (2) in a flat condition ready to be sewn with the top cover layer material (1), but also in retaining a predetermined shape of the natural leather material (1) relative to the mating wadding layer material (2) in view of the natural leather material (1) being uncertain as to its elasticity when sewing it with the wadding layer material (2), due to each natural leather material used varying in elasticity according to its origin of animal skin sections as discussed earlier.

Figure 5:
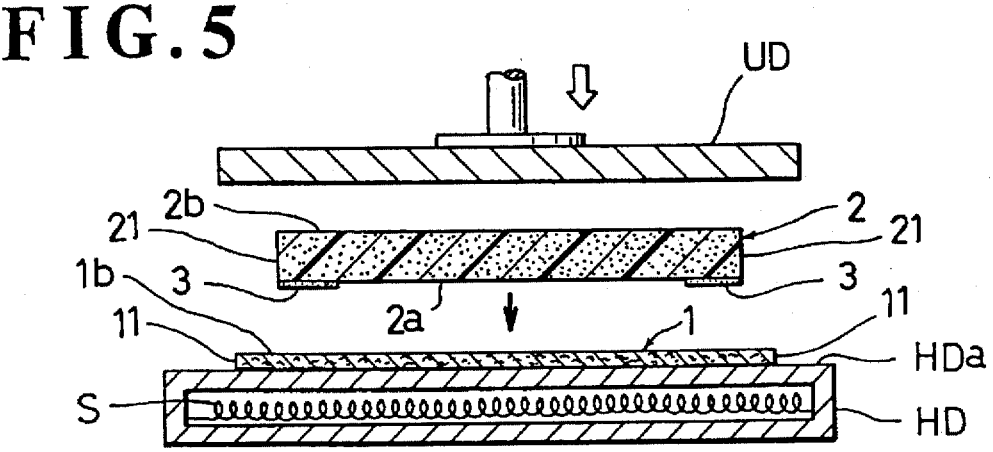
FIG. 5 is a sectional view showing a step of pressingly a bonding together top cover and wadding layer materials, using a pressure-heating bonding device.
Figure 6:
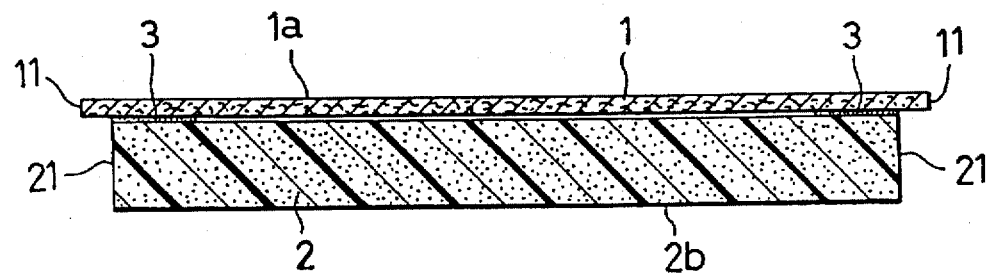
FIG. 6 is a sectional view of a bonded state of trim cover assembly section in the present invention.

At this cutting or stamping stage, the natural leather top cover layer material (1) is formed slightly greater in size and area than the wadding layer material (2), such as to create an outwardly projected peripheral edge portion (11) relative to the peripheral terminal edge (21) of wadding layer material (2), as best shown in FIG. 5. Preferably, the peripheral edge portion (11) may be projected about 3 mm from the peripheral edge (21) of wadding layer material (2). Also, the terminal edge (11) of top cover layer material (1) is formed with a plurality of notches (1A), and likewise the terminal edge (21) of wadding layer material (2) formed with a plurality of notches (2A), such that those notches (1A)(2A) meet with one another when the two layer materials (1)(2) are juxtaposed together. The notches (1A)(2A) serve as a positioning means not only to precisely determine a position of the top cover layer material (1) on the wadding layer material (2), when bonding the two layer materials (1)(2) together, but also determine a sewing position between a resultant trim cover assembly section (A) and other resultant trim cover assembly section (B), as will be described later.

Then, the stamped piece of natural leather top cover layer material (1) is turned upside down and placed on a heating surface (HDa) of a heater device (HD), with the reverse side (1b) thereof exposed outwards on the heater device (HD), as shown in FIG. 5. The heater device (HD) includes a heater coil (S) provided therein for generating and transmitting a heat to the heating surface (HDa) thereof.

Thereafter, an aqueous adhesive agent (3) (which, for example, contains a vinyl acetate resin as a main ingredient)

is applied to a bonding surface (2a) of the stamped piece of wadding layer material (2) along the peripheral edge portion thereof, as shown in FIG. 4, defining an annular adhesive applied region therealong. In this respect, about 8 mm of width may preferably be given to that adhesive applied region along the peripheral edge portion of wadding layer material (2).

The wadding layer material (2) is then turned over and brought to the top cover layer material (1) placed on the heater device (HD), so that the bonding surface (2a) of wadding layer material (2), on which the adhesive agent (3) is applied, is contacted upon the exposed reverse side (1b) of top cover layer material (1), as can be seen in FIG. 5. During this process, the top cover layer material (1) is determined in position relative to the wadding layer material (2), by way of aligning the notches (1A) of the former (1) with those (2A) of the latter (2), respectively.

Figure 7:
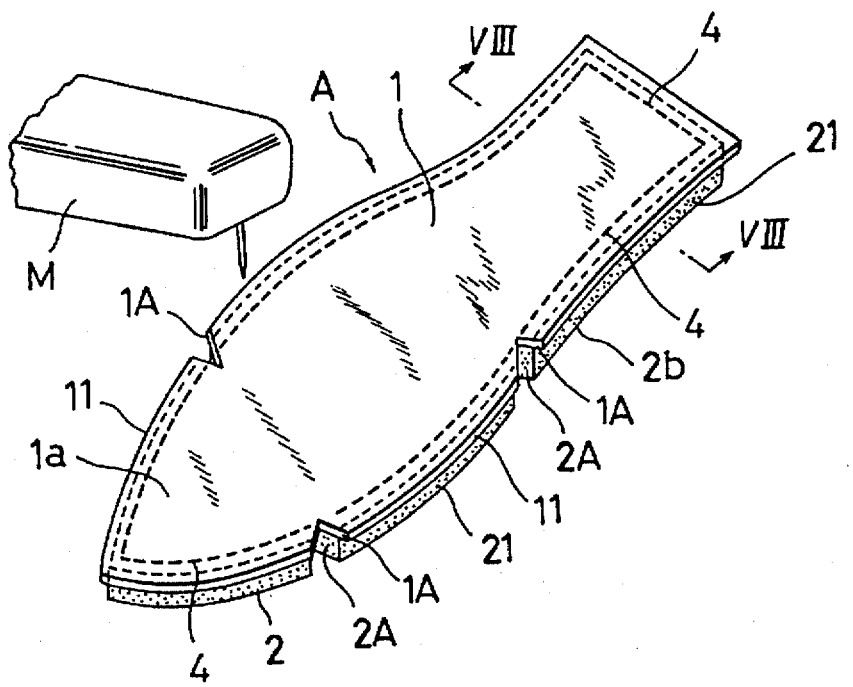
FIG. 7 is a partly broken perspective view showing a resulting trim cover assembly section.
Figure 8:
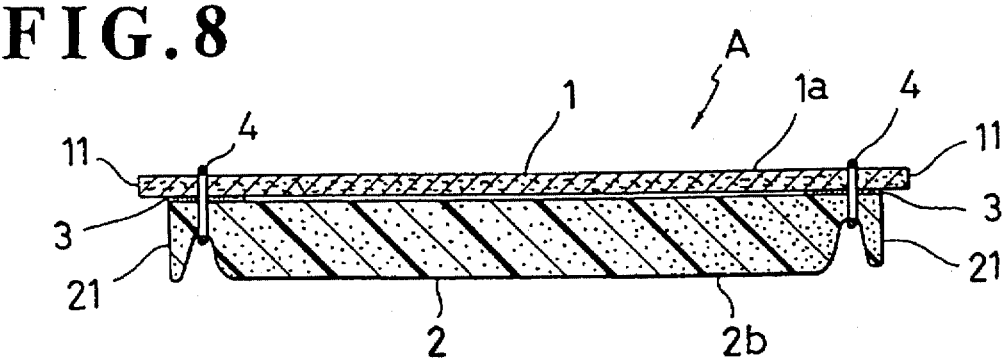
FIG. 8 is sectional view taken along the line VIII—VIII in FIG. 7.

Next, as indicated by the arrow in FIG. 5, a pressure plate (UD) is lowered and pressed against the thus-juxtaposed two materials (1)(2), while applying a heat thereto through operation of the heater device (HD). Accordingly, this heating vaporizes a water in the aqueous adhesive agent (3) and cures the same adhesive agent to bond the top cover layer material (1) to the wadding layer material (2). After lapse of predetermined time, the pressure plate (UD) is raised from the heater device (HD), whereupon a bonded unit of the two layer materials (1)(2) is formed as understandable in FIG. 6, in which the top cover layer material (1) is stretched uniformly on the wadding layer material (2). Such bonded unit is taken out from the heater device (HD) and left for a while for air drying. Thereafter, as shown in FIG. 7, both two layer materials (1)(2) thus bonded together are subjected to sewing by a sewing machine (M) along the adhesive applied region (at (3) in FIG. 4) in the peripheral terminal edge portions (1A)(2A) thereof. The resultant trim cover assembly section (A) is therefore formed in the manner as in FIG. 7. FIG. 8 shows, in cross-section, the same resultant trim cover assembly section (A), wherein both terminal edge portions (11)(21) of top cover and wadding layer materials (1)(2) are sewn together via the layer of cured adhesive agent (3). Designations (4) denote seams formed along the sewn peripheral terminal edge portions (11)(21).

It is to be appreciated that, the natural leather top cover layer material (1) is sewn to the wadding layer material (2) at the bonded areas where they have been bonded together, which effectively avoids creation of any wrinkle in the top cover material (1) and prevents floating of the same material (1) from the wadding layer material (2), when sewing them together. Thus, the resultant trim cover assembly maintains its best aesthetic appearance without any objectionable spots therein. In addition, the projection of terminal edge (11) of the top cover layer material (1) may serve as a guide for a worker to easily grasp with his or her fingertips to create a series of gathered points along the peripheral edges (11)(21) of both two layer materials (1)(2), to thereby permit for sewing therealong.

Figure 9:
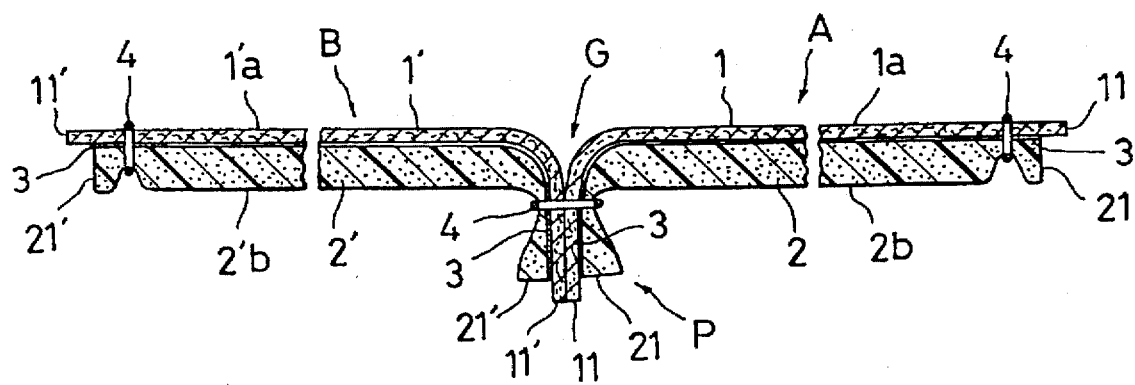
FIG. 9 is a sectional view showing an example of a part of trim cover assembly formed from a plurality of trim cover assembly sections.

Reference is made to FIG. 9. This mode suggests sewing together plural trim cover assembly sections into a main trim cover assembly covering all corresponding outer surface areas of cushion member (FC) as in FIG. 1. Namely, as a part of this formation of main trim cover assembly, FIG. 9 shows, by way of example, such a mode wherein a non-sewn state of trim cover assembly section (A), in which the natural leather top cover layer material (1) is bonded to the wadding layer material (2), is sewn with another second trim cover assembly section (B) which is formed only by the same pressure-heating bonding process as described above. As understandable from FIG. 1, the second trim cover assembly (B) is to cover the central seating area of the cushion member (FC) defined between the two bolster lateral areas of same to be respectively covered with a pair of the first trim cover assembly sections (A)(A). Of course, it should be understood that the same sewing steps to be stated hereinafter should also be applied between the first and third trim cover assembly sections (A)(C), although it will not be explained and shown for the sake of simplicity in description.

Although not shown, this particular second trim cover assembly (B) is formed through the above-described stamping and pressure-heating bonding processes into a generally rectangular shape conforming to that of corresponding central seating area of the cushion member (FC). Thus, it is to be understood from FIG. 9 that the trim cover assembly (B) comprises a natural leather top cover layer material (1') and a slab foam wadding layer material (2'), such that the terminal edge portions (11') of top cover layer material (1') is bonded to and along those (21') of the wadding layer material (2), using the same aqueous adhesive agent (3) and the same type of pressure heating device as shown in FIG. 5. Needless to mention, in the resulting second trim cover assembly (B), the top cover layer material (1') is stretched uniformly on the wadding layer material (2') due to the pressure-heating bonding process. The same goes for the third trim cover assembly section (C), though not shown.

According to this particular mode, one free terminal edge portion (at 11 and 21) of the first trim cover assembly (A) is sewn with one free terminal edge portion (at 11'and 21') of the second trim cover assembly (B). It is appreciated here that, although not shown, the terminal edges (11', 21') of the second trim cover assembly (B) are formed with a plurality of notches arranged in correspondence with the aforementioned ones (1A)(2A) of first trim cover assembly (A), and therefore, to meet the notches (1A)(2A) of first trim cover assembly (A) with those (not shown) of second trim cover assembly (B) will permit for determining a precise joining or sewing position between the two trim cover assemblies (A)(B) prior to sewing them together. In this way, as shown in FIG. 9, both free edge portions (11, 21)(11', 21') of those two trim cover assemblies (A)(B) are juxtaposed and sewn together such as to define a groove (G) thereabove and a projection (P) therebelow. As can be seen in FIG. 1, when affixing the sewn unit of those two trim cover assemblies (A)(B) over the corresponding areas of cushion member (FC), such projection (P) is to be fit in and along the groove (FC1) to cause a main trim cover assembly on the whole to neatly cover the cushion member (FC).

In accordance with the present invention, the natural leather top cover layer and wadding layer materials are cut as by stamping in a predetermined shape in a flat-plate form and then bonded together along the peripheral edge portions thereof so as to form separate plural trim cover assembly sections, whereby an worker can easily handle those bonded trim cover assembly sections to sew them together, without any undesired wrinkle or floating problems stated above, in order to produce a main trim cover assembly for covering a cushion member of a vehicle seat. This greatly expedites the forming of natural leather trim cover assembly with unchanged high quality, and as the wrinkle or floating problems are prevented, even if a natural leather top cover layer material is incorrectly bonded to a wrong wadding layer material, a worker can remove the top cover layer material therefrom and bond again the same to a correct wadding layer material again, so that such extreme high quality of natural leather top cover layer material will not be wasted in vain, but can be used again for bonding to a mating wadding layer material.

While having described the present invention as above, it should be understood that the invention is not limited to the illustrated embodiments, but other modifications, replacements and additions may be applied thereto structurally and methodologically, without departing from the scopes of the appended claims.

What is claimed is:

1. A leather trim cover assembly for a vehicle seat, comprising:

a top cover layer made of a leather material, said top cover layer being cut in a predetermined shape;

a flat-plate-like elastic foam layer cut in a predetermined shape;

an adhesive applying area defined on each of a peripheral edge portion of said top cover layer and a peripheral edge portion of said flat-plate-like elastic foam layer;

said top cover layer being bonded on said flat-plate-like elastic foam layer by an adhesive agent, only along said adhesive applying area, to define a bonded area between said top cover and flat-plate-like elastic foam layers only along each said peripheral edge portion;

substantially all an area on both said to cover layer and said flat-plate-like elastic foam layer outside said bonded area being unbonded;

and said top cover layer further sewn with said flat-plate-like elastic foam layer at and along said bonded area, so that said peripheral edge portion of said top cover layer and flat-plate-like elastic foam layer are sewn together along said bonded area.

2. The leather trim cover assembly in accordance with claim 1, wherein each said peripheral edge portion is provided with at least one position determining means for determining a relative position between said top cover layer and flat-plate-like elastic foam layer, and wherein said top cover layer is formed greater in size than said flat-plate-like elastic foam layer so that the peripheral edge portion thereof projects from the peripheral edge portion of said flat-plate-like elastic foam layer.

3. The leather trim cover assembly in accordance with claim 2, wherein said at least one position determining means comprises at least one notch.

4. A leather trim cover assembly for a vehicle seat, comprising:

a top cover layer made of a natural leather material, said top cover layer being cut in a predetermined shape;

a flat-plate-like elastic foam layer cut in a predetermined shape;

an adhesive applying area defined on each of a peripheral edge portion of said top cover layer and a peripheral edge portion of said flat-plate-like elastic foam layer;

said top cover layer being bonded on said flat-plate-like elastic foam layer by an adhesive agent, only along said adhesive applying area, to define a bonded area between said top cover layer and flat-plate-like elastic foam layer only along each said peripheral edge portion;

substantially all an area on both said top cover layer and said flat-plate-like plastic foam layer outside said bonded area being unbonded;

said top cover layer being further sewn with said flat-plate-like elastic foam layer at and along said bonded area, so that each said peripheral edge portion of said top cover layer and said flat-plate-like elastic foam layer are sewn together along said bonded area.

5. The leather trim cover assembly in accordance with claim 4, wherein each said peripheral edge portion is provided with at least one position determining means for determining a relative position between said top cover layer and flat-plate-like elastic foam layer, and wherein said top cover layer is formed greater in size than said flat-plate-like elastic foam layer so that the peripheral edge portion thereof projects from the peripheral edge portion of said flat-plate-like elastic foam layer.

6. The leather trim cover assembly in accordance with claim 5, wherein said at least one position determining means comprises at least one notch.

7. A leather trim cover assembly for a vehicle seat, comprising:

a top cover layer made of a natural leather material, said top cover layer being cut in a predetermined shape;

a flat-plate-like elastic layer cut in a predetermined shape;

an adhesive applying area defined on each of a peripheral edge portion of said top cover layer and a peripheral edge portion of said flat-plate-like elastic foam layer;

said top cover layer being bonded on said flat-plate-like elastic foam layer by an aqueous adhesive agent, along said adhesive applying area;

said top cover layer being further bodily pressed against said flat-plate-like elastic foam layer by means of a pressure-heating device and thus pressingly bonded thereon along said adhesive applying area while applying a heat thereto, so as to define a bonded area between said top cover layer and said flat-plate-like elastic foam layer along each said peripheral edge portion thereof;

substantially all an area on both said top cover layer and said flat-plate-like elastic foam layer outside said bonded area being unbonded, said top cover layer being further sewn with said flat-plate-like elastic foam layer at and along said bonded area, so that each said peripheral edge portion of said top cover layer and flat-plate-like elastic foam layer are sewn together along said bonded area.

8. The leather trim cover assembly in accordance with claim 7, wherein each said peripheral edge portion is provided with at least one position determining means for determining a relative position between said top cover layer and flat-plate-like elastic foam layer, and wherein said top cover layer is formed greater in size than said flat-plate-like elastic foam layer so that the peripheral edge portion thereof projects from the peripheral edge portion of said flat-plate-like elastic foam layer.

9. The leather trim cover assembly in accordance with claim 8, wherein said at least one position determining means comprises at least one notch.

10. The leather trim cover assembly in accordance with claim 9, wherein the peripheral edge portion of said top cover layer and flat-plate-like elastic foam layer are provided with at least one portion determining means for not only determining a relative position between said top cover layer and flat-plate-like elastic foam layer, but also determining relative positions among said plurality of trim cover assembly sections, and wherein said top cover layer is formed greater in size than said flat-plate-like elastic foam layer so that the peripheral edge portion thereof projects from the peripheral edge portion of said flat-plate-like elastic foam layer.

11. The leather trim cover assembly in accordance with claim 10, wherein said at least one position determining means comprises at least one notch.

12. In a leather trim cover assembly for a vehicle seat which is formed by a plurality of leather trim cover assembly sections, each of said plurality of leather trim cover assembly sections comprising:

a top cover layer made of a leather material, said top cover layer being cut in a predetermined shape;

a flat-plate-like elastic foam layer cut in a predetermined shape;

an adhesive applying area defined on each of a peripheral edge portion of said top cover layer and a peripheral edge portion of said flat-plate-like elastic foam layer;

said top cover layer being bonded on said flat-plate-like elastic foam layer by an adhesive agent, along said adhesive applying area, to define a bonded area between said top cover layer and said flat-plate-like elastic foam layer along each said peripheral edge portion thereof;

substantially all an area on both said top cover layer and said flat-plate-like elastic foam layer outside said bonded area being unbonded;

and said plurality of trim cover assembly sections being sewn with one another at and along said bonded area, so that bonded peripheral edge portions of said plurality of trim cover assembly sections are sewn together along said bonded area.

13. In a leather trim cover assembly for a vehicle seat which is formed by a plurality of leather trim cover assembly sections, each of said plurality of leather trim cover assembly sections comprising:

a top cover layer made of a natural leather material, said top cover layer being cut in a predetermined shape;

a flat-plate-like elastic foam layer cut in a predetermined shape;

an adhesive applying area defined on each of a peripheral edge portion of said top cover layer and a peripheral edge portion of said flat-plate-like elastic foam layer;

said top cover layer being bonded on said flat-plate-like elastic foam layer by an adhesive agent, along said adhesive applying area, to define a bonded area between said top cover layer and said flat-plate-like elastic foam layer along each said peripheral edge portion thereof;

substantially all an area on both said top cover layer and said flat-plate-like elastic foam layer outside said bonded area being unbonded;

and said plurality of trim cover assembly sections being sewn with one another at and along said bonded area, so that bonded peripheral edge portions of said plurality of trim cover assembly sections are sewn together along said bonded area.

14. The leather trim cover assembly in accordance with claim 13, wherein the peripheral edge portion of said top cover layer and flat-plate-like elastic foam layer are provided with at least one position determining means for not only determining a relative position between said top cover layer and flat-plate-like elastic foam layer, but also determining relative positions among said plurality of trim cover assembly sections, and wherein said top cover layer is formed greater in size than said flat-plate-like elastic foam layer so that said peripheral edge portion thereof projects from the peripheral edge portion of said flat-plate-like elastic foam layer.

15. The leather trim cover assembly in accordance with claim 14, wherein said at least one position determining means comprises at least one notch.

16. In a leather trim cover assembly for a vehicle seat which is formed by a plurality of leather trim cover assembly sections, each of said plurality of leather trim cover assembly sections comprising:

a top cover layer made of a natural leather material, said top cover layer being cut in a predetermined shape;

a flat-plate-like elastic foam layer cut in a predetermined shape;

an adhesive applying area defined on each of a peripheral edge portion of said top cover layer and a peripheral edge portion of said flat-plate-like elastic foam layer;

said top cover layer being bonded on said flat-plate-like elastic foam layer by an aqueous adhesive agent, along said adhesive applying area;

said top cover layer being further bodily pressed against said flat-plate-like elastic foam layer by means of a pressure-heating device and thus pressingly bonded thereon along said adhesive applying area while applying a heat thereto, so as to define a bonded area between said top cover layer and said flat-plate-like elastic foam layer along each said peripheral edge portion thereof; and substantially all an area on both said top cover layer and said flat-plate-like elastic foam layer outside said bonded area being unbonded, and said plurality of trim cover assembly sections being sewn with one another at and along said bonded area, so that bonded peripheral edge portions of said plurality of trim cover assembly sections are sewn together along said bonded area.

17. The leather trim cover assembly in accordance with claim 16, wherein the peripheral edge portion of said top cover layer and flat-plate-like elastic foam layer are provided with at least one position determining means for not only determining a relative position between said top cover layer and flat-plate-like elastic foam layer, but also determining relative positions among said plurality of trim cover assembly sections, and wherein said top cover layer is formed greater in size than said flat-plate-like elastic foam layer so that peripheral edge portion thereof projects from the peripheral edge portion of said flat-plate-like elastic foam layer.

18. The leather trim cover assembly in accordance with claim 17, wherein said at least one position determining means comprises at least one notch.

* * * * *